United States Patent [19]

Duffy

[11] Patent Number: 5,297,647
[45] Date of Patent: Mar. 29, 1994

[54] VARIABLE ASSIST POWER STEERING GEAR WITH HYDRAULIC REACTION CONTROLS

[75] Inventor: James J. Duffy, Livonia, Mich.

[73] Assignee: Ford Motor Company, Dearborn, Mich.

[21] Appl. No.: 33,728

[22] Filed: Mar. 18, 1993

[51] Int. Cl.⁵ ............................................... B62D 5/06
[52] U.S. Cl. .................................................... 180/143
[58] Field of Search ................. 180/132, 149, 143, 141

[56] References Cited

U.S. PATENT DOCUMENTS

| | | | |
|---|---|---|---|
| 3,877,540 | 4/1975 | Masuda et al. | 180/79.2 R |
| 4,434,866 | 3/1984 | Duffy | 180/143 |
| 4,561,521 | 12/1985 | Duffy | 180/142 |
| 4,570,735 | 2/1986 | Duffy | 180/142 |
| 4,570,736 | 2/1986 | Waldorf | 180/143 |
| 4,676,334 | 6/1987 | Nakamura et al. | 180/142 |
| 4,715,464 | 12/1987 | Nakamura et al. | 180/143 |
| 4,730,687 | 3/1988 | Chikuma et al. | 180/143 |
| 4,765,428 | 8/1988 | Kawakami et al. | 180/143 |
| 4,805,714 | 2/1989 | Nakamura et al. | 180/141 |
| 4,905,784 | 3/1990 | Yamashita | 180/143 |
| 4,913,250 | 4/1990 | Emori et al. | 180/79.1 |
| 5,016,723 | 5/1991 | Sano | 180/143 |
| 5,147,009 | 8/1992 | Chikuma et al. | 180/143 |

Primary Examiner—Margaret A. Focarino
Assistant Examiner—Kevin Hurley
Attorney, Agent, or Firm—Roger L. May; Raymond L. Coppiellie

[57] ABSTRACT

The invention comprises a steering gear for an automotive vehicle having a rotary valve mechanism that controls pressure distribution to a fluid motor that establishes a power assist during steering maneuvers, pressure reaction pistons being provided to establish a resistance to relative movement of the rotary valve elements, and a modulator valve in the steering system for establishing a variable pressure on the reaction pistons wherein provision is made for changing the pressure modulating characteristics of the modulator valve depending upon vehicle speed.

4 Claims, 5 Drawing Sheets

VARIABLE ASSIST POWER STEERING GEAR WITH HYDRAULIC REACTION CONTROLS

TECHNICAL FIELD

This invention relates to power steering gears for automotive vehicles with a vehicle speed sensitive variable assist.

BACKGROUND OF THE INVENTION

My invention comprises improvements in a power steering gear of the kind disclosed in my pending application Ser. No. 046,701, filed April 16, 1993, which is a continuation-in-part of my patent application Ser. No. 811,963, filed Dec. 23, 1991, entitled "Electronic Power Assist Control" now abandoned. Both of these patent applications are assigned to the assignee of the present invention.

As in the case of the power steering gear disclosed in my co-pending application Ser. No. 046,701, the steering gear of my present invention comprises a fluid motor for actuating dirigible wheels of a motor vehicle. Steering pressure for the fluid motor is developed by a power steering pump driven by the vehicle engine. A rotary valve assembly is used to control pressure distribution from the pump to the motor to effect a power steering assist in either direction during turning maneuvers. The rotary valve assembly has an inner valve member connected mechanically to the steering shaft and a rotary valve sleeve surrounding the inner valve member. The valve sleeve is connected mechanically to the driven portions of the steering gear mechanism as steering torque is delivered to the dirigible wheels. A torsion bar resiliently resists relative angular displacement of the sleeve and the inner valve member.

The valve assembly comprises registering valve lands on the inner valve member and in the sleeve. The valve lands cooperate to control pressure distribution from the pump to either of two sides of a double-acting piston of a fluid motor. Pressure developed in the pressure passage connecting the pump with the motor is distributed to each of two pressure working chambers defined in part by the double-acting piston. When the pressure in one working chamber increases and the pressure in the other working chamber decreases, the vehicle is adapted to turn in one direction. Upon a reversal in the direction of the pressure differential in the fluid motor, the steering direction reverses.

Effective flow area across the valve lands of the rotary valve mechanism changes as steering torque is applied. Since the flow delivered by the pump is constant regardless of pump speed, the pressure differential developed in either one working chamber or the other is a function of the reciprocal of the square of the effective flow area across the valve lands. This characteristic is described in my co-pending application identified above.

A vehicle speed sensitive steering gear is described in U.S. Pat. No. 4,570,736. The relationship between torque applied to the input shaft and the steering pressure developed in the fluid motor of the '736 patent can be changed by a vehicle speed sensitive valve arrangement in which a parallel flow path from the pump to the valve system is established at high speeds, thereby making the pressure sensitive to changes in torque. As the vehicle speed increases, the flow through the parallel flow circuit is increased thereby providing a reduced power assist at high speeds.

In a steering system such as that shown in prior art U.S. Pat. No. 4,570,736, it is necessary to overcome the effect of lateral acceleration during a turning maneuver at any given speed. Thus, the steering assist during straight ahead driving at a given speed will be less than the steering assist that is available during a turning maneuver at that same speed because the effort that must be applied to the steering shaft must be greater during the turning maneuver in order to overcome the effects of lateral acceleration of the vehicle. This increased force results in an increase in steering pressure. The vehicle operator compensates for the change in steering effort that is required to execute a turning maneuver compared to the steering effort that is required for steering corrections at the same vehicle speed during straight ahead driving.

The steering system described in my co-pending application provides a different steering characteristic than that which is described in prior art U.S. Pat. No. 4,570,736. The resistance to steering effort in the design of my co-pending application is determined by a modulated steering pressure that acts on reaction pistons. This opposes relative movement of the steering valve elements. The steering pressure then will increase linearly during torque increases. A pressure modulator valve is actuated when the steering pressure reaches a calibrated value. The output of the modulator valve then is distributed to the reaction pistons. At any steering torque in excess of the value that triggers the operation of the modulator valve, the differential steering pressure resulting from an incremental increase in steering torque will increase at a greater rate. This change from one pressure/torque relationship to the other is characterized by a so-called breakpoint.

When the vehicle is operated at high speeds and the steering torque increases to a value greater than a calibrated value, the steering pressure applied to the reaction pistons increases at a reduced rate, thereby reducing the torque increase for a given steering pressure increase.

BRIEF DESCRIPTION OF THE INVENTION

According to a principal feature of the present invention, I have provided a variable breakpoint in the pressure/torque relationship. Furthermore, the improved steering system avoids the steering characteristic that is present in the steering system described, for example, in U.S. Pat. No. 4,570,736. There is no necessity for the operator to react to a different steering sensation as a result of an increase in lateral acceleration during a turning maneuver at any given speed.

My present invention is characterized also by a simplified valve system that requires the use of only a single modulator valve rather than a speed proportional solenoid valve, a pressure limiter valve and a modulator valve as required in the valve system described in my co-pending patent application previously described.

I have provided multiple breakpoints in the characteristic curve for the simplified valve system of my invention by making provision for changing the modulating characteristics of the single modulator valve used in the system. In contrast, multiple breakpoints in the design of my co-pending application are obtained by using multiple modulator valves. This feature of my present invention is accomplished by changing the effective spring force that acts on the modulator valve by opposing the spring force with the force of a solenoid actuator that responds to varying vehicle speed. Thus, when the speed is low, the steering torque at which a breakpoint occurs is low. If a steering maneuver is in the process of taking place at that low speed, further increases in steering torque then will be accompanied by a higher rate of increase in steering pressure for any incremental increase in steering torque. At higher vehicle speeds, the same increase in steering pressure for an incremental increase in torque will occur at a higher steering torque value. It is possible, therefore, to have the same steering assist at low speeds with high lateral acceleration as the steering assist that would occur at that same speed when the operator is engaged in straight ahead corrective steering.

By providing multiple breakpoints in the characteristic relationship between steering pressure and steering torque, the vehicle operator can enjoy an increased steering assist at low vehicle speeds compared to the steering assist that is available at high vehicle speeds. This characteristic can be achieved without any change in the steering sensation due to lateral acceleration that is present during a turning maneuver as distinct from corrective steering adjustments during straight ahead driving.

BEST MODE FOR CARRYING OUT THE INVENTION

Figure 1:
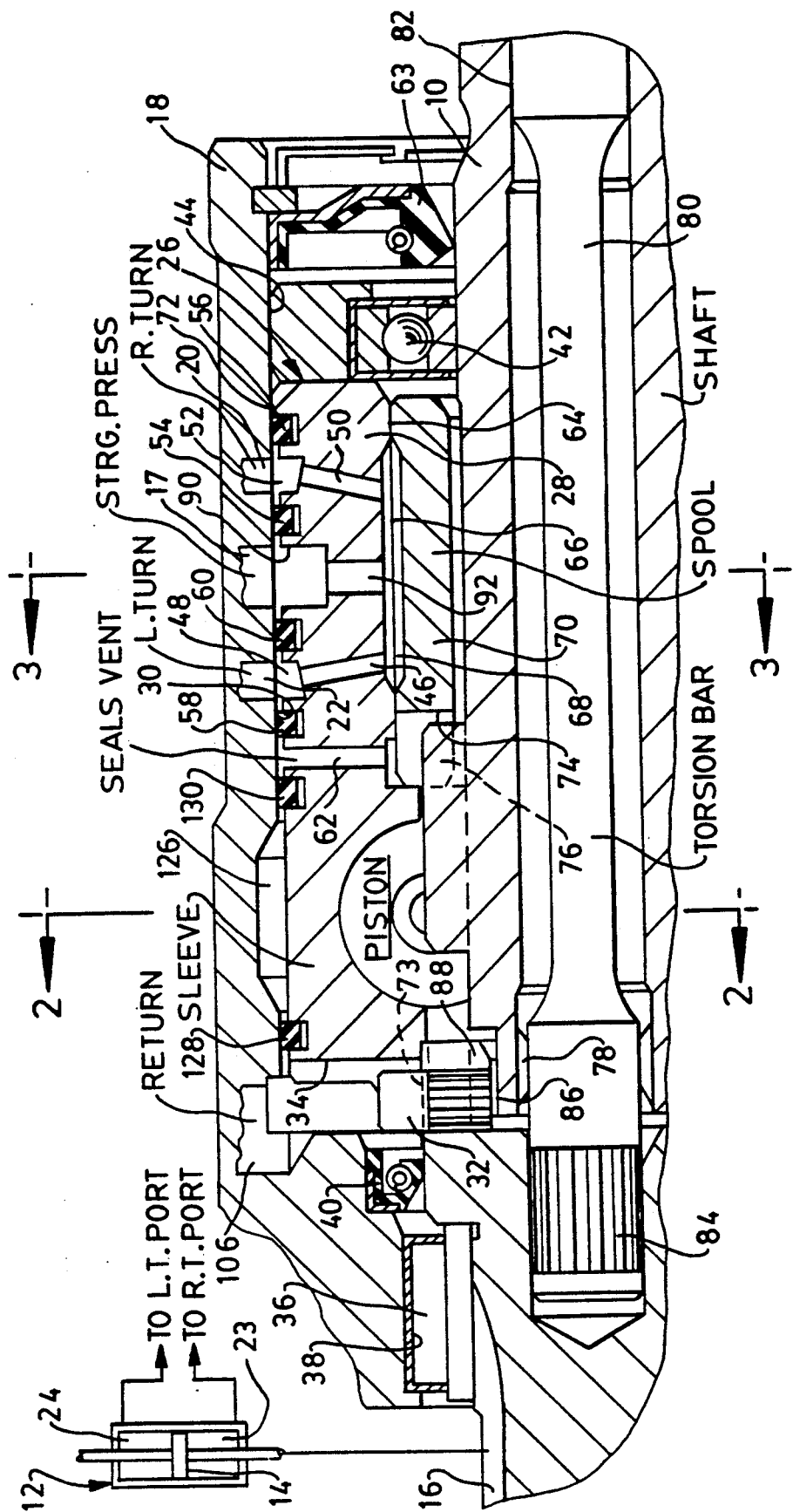
FIG. 1 is a cross-sectional view, partly in schematic, of a rotary steering valve mechanism for a power steering gear.

Numeral 10 in FIG. 1 designates a driver-controlled steering shaft for a motor vehicle. Numeral 12 generally designates, in schematic form, a fluid motor having a pressure-actuated piston 14 connected to the vehicle traction wheels through a suitable steering linkage (not shown) and to a pinion 16, which is adapted to be connected by means of a rack-and-pinion assembly to the piston 14. Steering pressure of the power steering pump is adapted to deliver working pressure to steering pressure input port 17.

The steering gear includes a cylindrical housing 18 in which steering pressure port 17 is formed. A right-turn port 20 and a left-turn port 22 also are formed in the housing 18. These are connected, respectively, to pressure chambers 23 and 24 for the fluid motor 12.

FIG. 1 shows a valve assembly identified generally by reference numeral 26. This valve assembly comprises a valve sleeve 28 situated in a valve cylinder 30. A drive pin 32 formed in the pinion 16 extends radially with respect to the axis of the sleeve 28 and engages an end groove 34 in one end of the sleeve 28. Thus, during steering maneuvers, the sleeve 28 moves with the pinion 16 within the steering valve cylinder 30.

The pinion 16 is journalled by a bearing 36 in bearing opening 38 formed in the housing 18. A fluid seal 40 seals the pinion and the housing opening through which the pinion extends.

Steering shaft 10 is journalled by bearing 42 on the right-hand side of the sleeve 28 as shown in FIG. 1. Bearing 42 provides a bearing support as it is carried by the cylinder 30 of the housing 18 as shown at 44.

Left-turn passage 46 in the sleeve 28 communicates with annular groove 48, which in turn communicates with left-turn passage 22. Similarly, right-turn port 50 communicates with an annular groove 52 in sleeve 28. Groove 52 in turn communicates with right-turn port 20. Seal rings are disposed in seal ring grooves situated on either side of the groove 52 as shown at 54 and 56. Similarly, seal ring grooves receive seal rings on either side of the left-turn port 22, as shown at 58 and 60. A vent port 62 in the sleeve 28 communicates with a vent port 106 in the housing 18. This provides a venting of the interior of the valve cylinder 30 between the seal 40 and a corresponding lip seal 63.

The valve sleeve 28 has a central opening 64 in which is formed internal valve lands 66. These register with external valve lands 68 formed on a valve spool 70, the latter being piloted at each of its axial ends in the opening 64.

Valve sleeve 28 is piloted in the housing 18 as pilot surface 72 registers with the opening 44. The other end of the sleeve 28 is piloted at 73, as seen at the left-hand side of the sleeve 28 as shown in FIG. 1.

The spool 70 is provided with a slot 74 which registers with a radial projection 76 formed on the torque input shaft 10, the latter being piloted by bearing element 78 on the left hand of the torsion bar 80.

Torque input shaft 10 is drivably connected to the torsion bar 80 at 82. The left-hand end of the torsion bar 80 is splined as shown at 84 to an internally splined opening in the end of the pinion 16.

The left end of the torque input shaft 10 is provided with dog coupling teeth in the form of angularly spaced slots 86 which register with corresponding internal coupling teeth 88 in the right end of the pinion 16, thus forming a lost motion connection between the shaft 10 and the pinion 16. The degree of relative motion established by the dog coupling will permit the torsion bar to transmit torque from the input shaft 10 to the pinion 16 up to a limit. When that limit is reached, torque is transferred directly from the shaft 10 to the pinion 16 through the dog coupling.

Any misalignment of the sleeve 28 with respect to the axis of the pinion 16 can be accommodated by reason of the articulation that is permitted by the end bearing supports at the right end of the sleeve as shown at 72 and the left end of the sleeve as shown at 3. Regardless of the angular disposition of the axis of the sleeve 28 with respect to the axis of the pinion 16, the spool 70 will precisely register with the sleeve 28 because of the articulated connection between the spool 70 and the input shaft 10 provided by the slot 74 and the projection 76. The spool thus can be considered to be a floating valve spool which always registers precisely with the internal valve lands of the sleeve 28 regardless of any slight misalignment of the sleeve with respect to the pinion 16.

Figure 3:
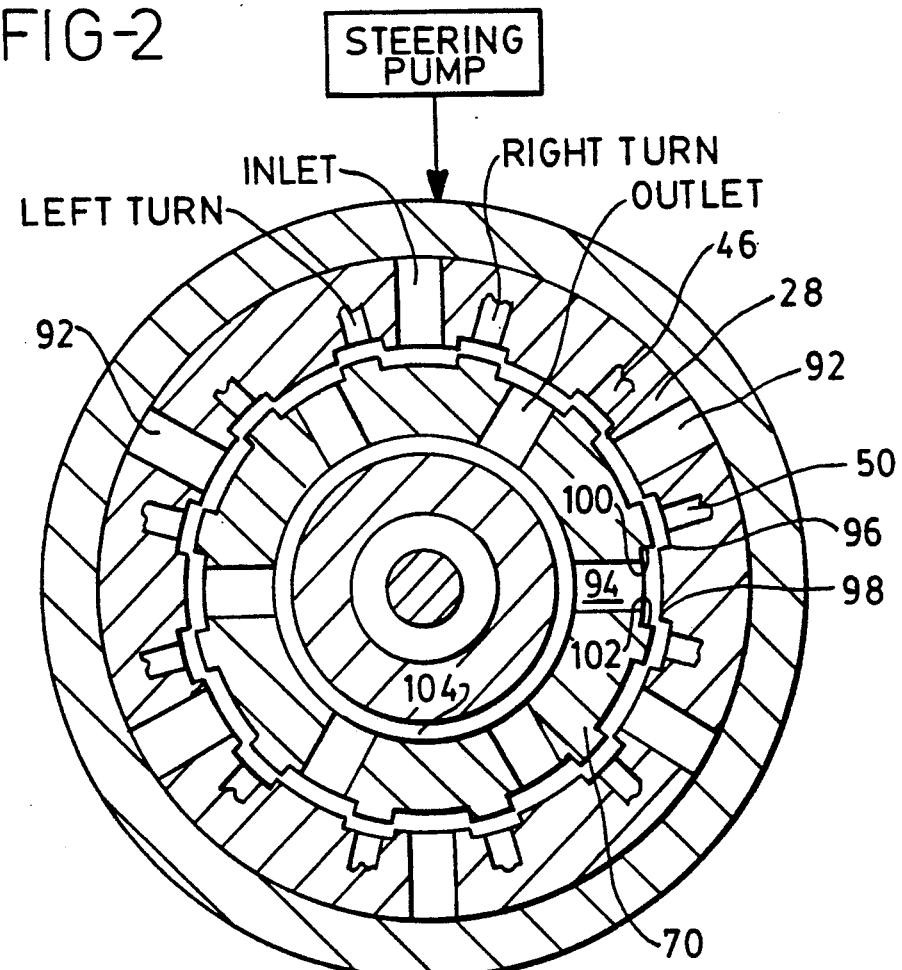
FIG. 3 is a cross-sectional view as seen from the plane in line 3—3 of FIG. 1.
Figures 4, 5:
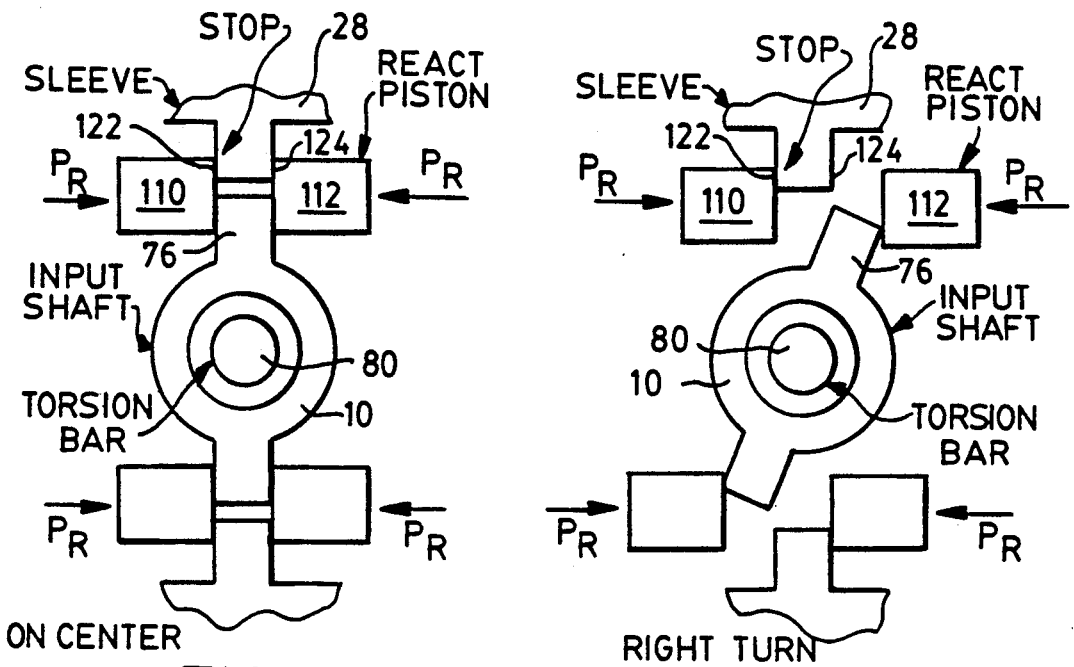
FIG. 4 is a schematic representation of the reaction pistons which act on the rotary valve elements, the positions of the reaction pistons being shown in their positions during straight ahead driving.
FIG. 5 is a view similar to FIG. 4, but the reaction pistons have been displaced to the positions they would assume during a turning maneuver.

As seen in FIG. 1, pressure input port 17 communicates with a groove 90 in the sleeve 28. This, in turn, communicates with radial ports 92. Valve spool 70 is provided with radial ports 94, as seen in FIG. 3, which are situated between internal valve lands 96 and 98 formed in the valve sleeve. External valve lands 100 and 102 formed on the spool 70 register, respectively, with internal lands 96 and 98, thus forming a flow passage on either side of the radial ports 94.

The radially inward ends of the ports 94 communicate with annular space 104, which is a flow return passage that communicates with return flow passage 106 seen in FIG. 1.

When the valve spool is centered with respect to the sleeve, the flow area established by the registering valve lands for the right-turn port 50 is substantially the same as the flow area for the left-turn port 46. Thus, the pressure differential across the steering motor piston 14 is zero and the pressure forces are balanced. Fluid flow delivered through the passage 92 is distributed in this case across the valve lands and through the radial ports 94 to the flow return passage.

If steering torque is applied in a right-turn direction to the torsion bar, the valve spool will shift slightly in a clockwise direction relative to the valve sleeve seen in FIG. 3, thereby enlarging the flow area between passage 92 and port 50 and simultaneously decreasing the flow area between passage 92 and the port 46 leading to the right-turn side of the fluid motor. This provides a steering assist which complements the steering torque applied to the pinion through the torsion bar.

If torque is delivered to the pinion 16 through the torsion bar 80 in the opposite direction, the flow area for the left-turn port is increased, and the flow area for the right-turn port is decreased, thus providing for a steering assist in the opposite direction.

It should be noted in FIG. 3 that in a left turn, as the external land controlling the flow to the passage 50 increases, the degree of communication between passage 92 and port 46, and the corresponding degree of communication between port 50 and radial passage 94, are decreased. The converse is true when the direction of the steering torque is reversed. This change in flow area results in a pressure differential in accordance with the pressure function described in the description of the "Background of the Invention" set forth above.

According to a principal feature of my invention, I have provided a means for resisting the angular motion of the spool relative to the sleeve, and I have provided a means for varying the amount of that resistance depending upon the speed of the vehicle. This is achieved by the hydraulic reaction pistons shown in FIG. 2.

Figure 2:
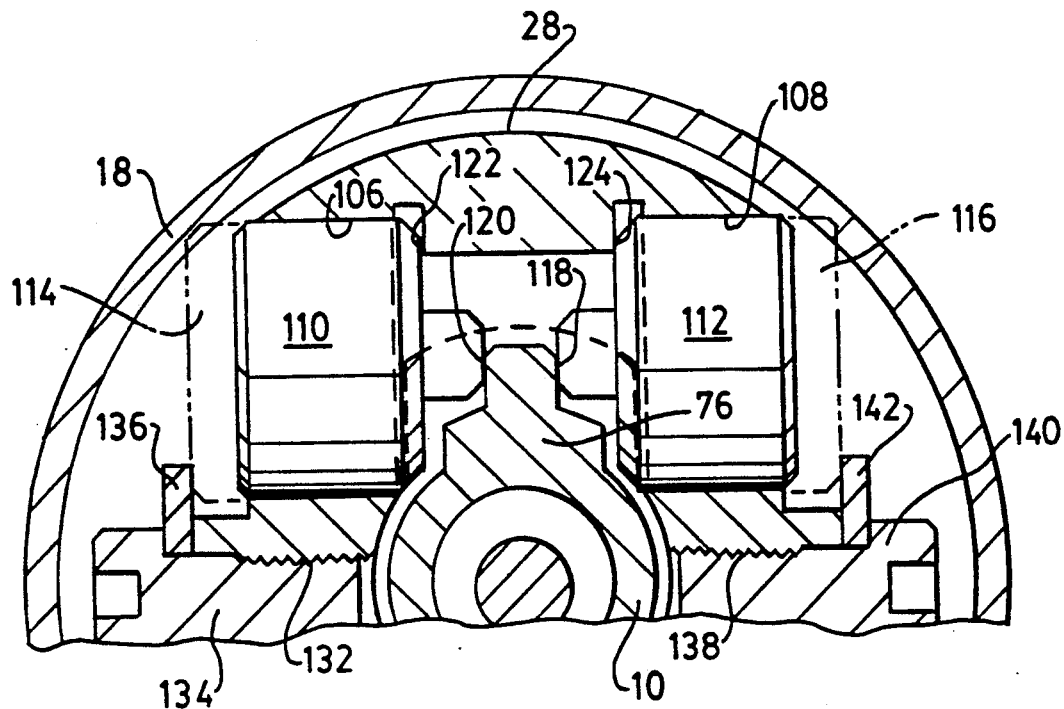
FIG. 2 is a cross-sectional view as seen from the plane in section line 2—2 of FIG. 1.

As seen in FIG. 2, the sleeve is provided with a pair of opposed reaction pressure cylinders 106 and 108. A reaction piston 110 is slidably disposed in cylinder 106, and a corresponding piston 112 is slidably disposed in reaction cylinder 108. Piston 110 and cylinder 106 define a reaction pressure chamber 114 which communicates with a reaction pressure port (not shown) formed in the housing 18. Similarly, piston 112 and cylinder 108 define a reaction pressure chamber 116 which communicates with the same reaction pressure port formed in the housing 18.

Projection 76 on the steering shaft 10 includes a reaction surface 118 which is engaged by the piston 112 and a reaction surface 120 which is engaged by the piston 110. When the working chamber 116 is pressurized, a reaction pressure force developed on the piston 112 causes a counterclockwise torque to be applied to the shaft 10. Similarly, if the pressure chamber 114 is pressurized, piston 110 will apply a clockwise torque to the shaft 10 as viewed in FIG. 2.

When the shaft 10 is centered with respect to the sleeve, piston 110 engages a stop shoulder 122 formed in the sleeve 28; and piston 112 engages a stop shoulder 124, also formed in the sleeve 28. During straight-ahead driving, when the steering pressures on either side of the piston 14 of the fluid motor are balanced, the reaction pressures in chambers 114 and 116 are balanced and the pistons 110 and 112 assume the position shown in FIG. 2.

If the spool is displaced relative to the sleeve, one of the pistons 110 or 112 is displaced from its stop 106 or 124 and the pressure in the reaction pressure chambers 114 and 116 resists relative angular displacement of the shaft with respect to the sleeve.

It is apparent from the foregoing description that the magnitude of steering torque that is achieved is dependent in part upon the pressure established in the chambers 114 and 116. I have made provision for controlling that pressure differential so that the relationship between steering torque and steering pressure can be modified or tailored to suit any particular driving condition. For example, at high speeds, the resistance to relative angular displacement of the steering shaft relative to the sleeve is increased.

The pressure chambers 114 and 116 communicate with an annular space 126, as seen in FIG. 1, which surrounds the sleeve. Space 126 is sealed from the adjacent fluid passages by a pair of axially spaced seal rings 128 and 130.

The sleeve 28, as seen in FIG. 2, is provided with a threaded opening 132 which receives a bolt 134 which retains a stop washer 136 located in the path of movement of piston 110. Thus, the stop washer 136 limits the left-hand movement of the piston 110 as viewed in FIG. 2. Similarly, a threaded opening 138 is formed in the opposite side of the opening 132. This opening receives a bolt 140 which retains another stop washer 142 which limits the movement of the piston 112 in a right-hand direction.

Figure 6:
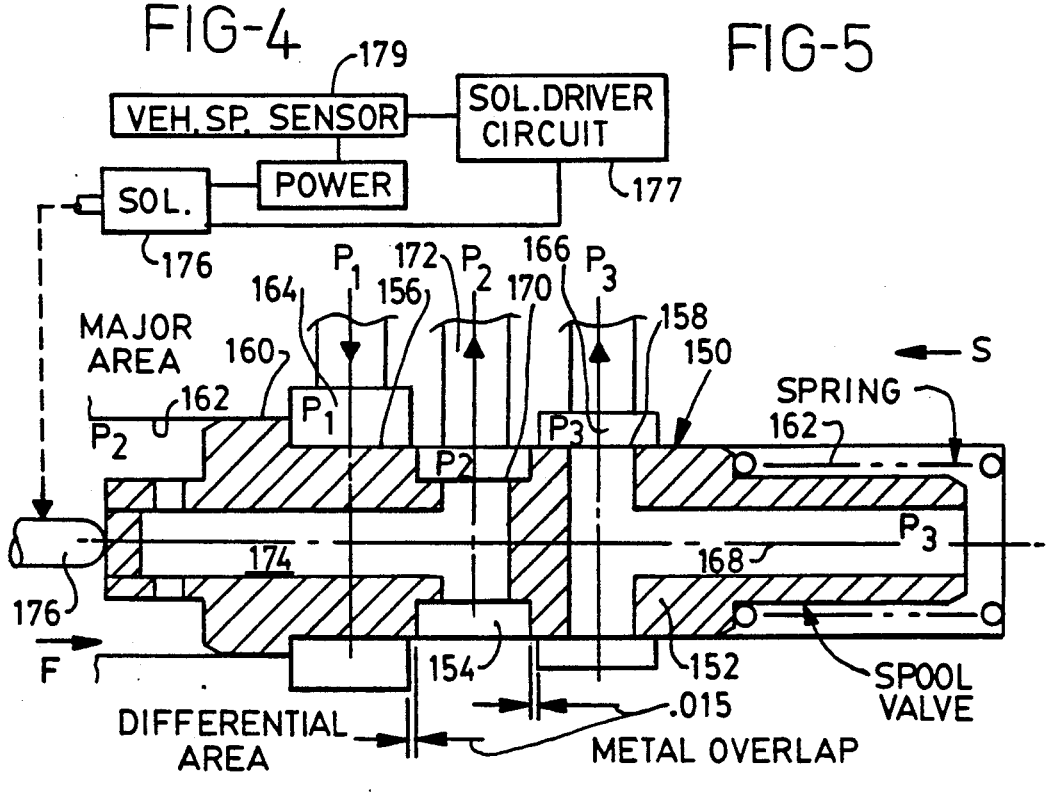
FIG. 6 is a schematic cross-sectional view of a modulator valve for use in the steering system of my invention.

As seen in FIG. 6, the modulator valve is identified generally by reference numeral 150. It comprises a movable valve spool 152 situated in valve chamber 154 located in a valve housing. The valve spool 152 comprises spaced valve lands 156 and 158. The valve spool, at its left end, is provided with an increased diameter 160, which is received in a large diameter portion 162 of the valve chamber. The right hand end of the spool 152 is acted upon by valve spring 162.

Land 156 registers with inlet pressure port 164 and land 158 registers with return pressure port 166. Port 166 communicates through internal passages 168 with the spring chamber at the right hand end of the valve spool 152. An outlet pressure port 170 communicates with outlet pressure passage 172, which communicates with the reaction chambers. Port 170 communicates through internal passages 174 with the left hand end of the valve spool 152.

Land 160 creates a differential area which equals area A2 on which pressure P2 acts and area A1 on which pressure P1 acts.

Figure 8:
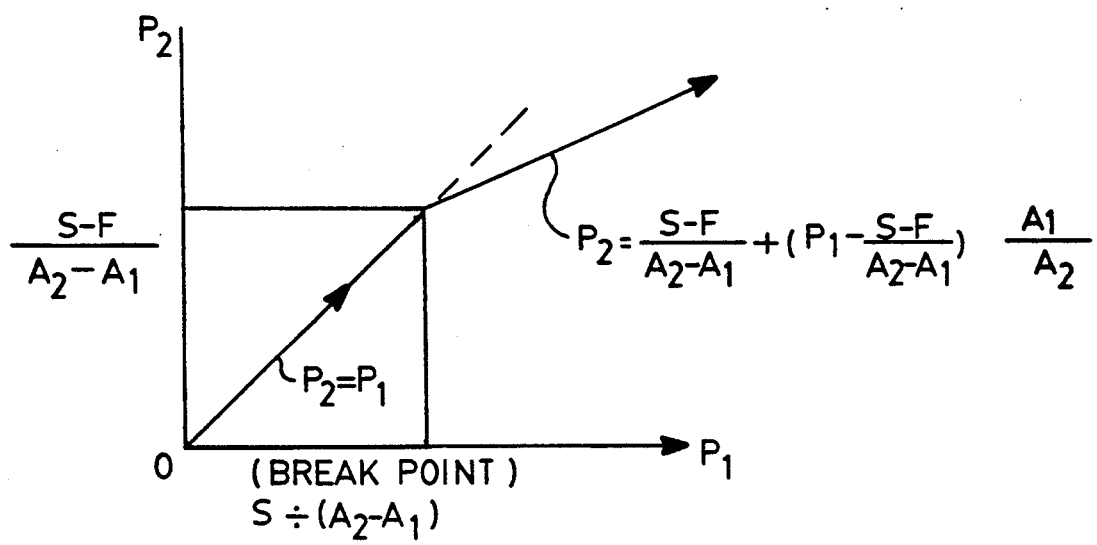
FIG. 8 is a chart which shows the steering pressure characteristics that would be present before and after a breakpoint.

When pressure P2, which is the pressure acting on the reaction cylinders, is small, P2 equals P1 as indicated in FIG. 8. After P2 equals a value corresponding to the breakpoint indicated in FIG. 8, the pressure P2 increases at a slower rate upon further increases in the input pressure. The magnitude of the pressure P2, after the breakpoint is achieved, is represented by the equation: $P2 = S \div (A2-A1) + (P_1 - S \div [A2-A1]) \times A1 \div A2$.

Figure 7:
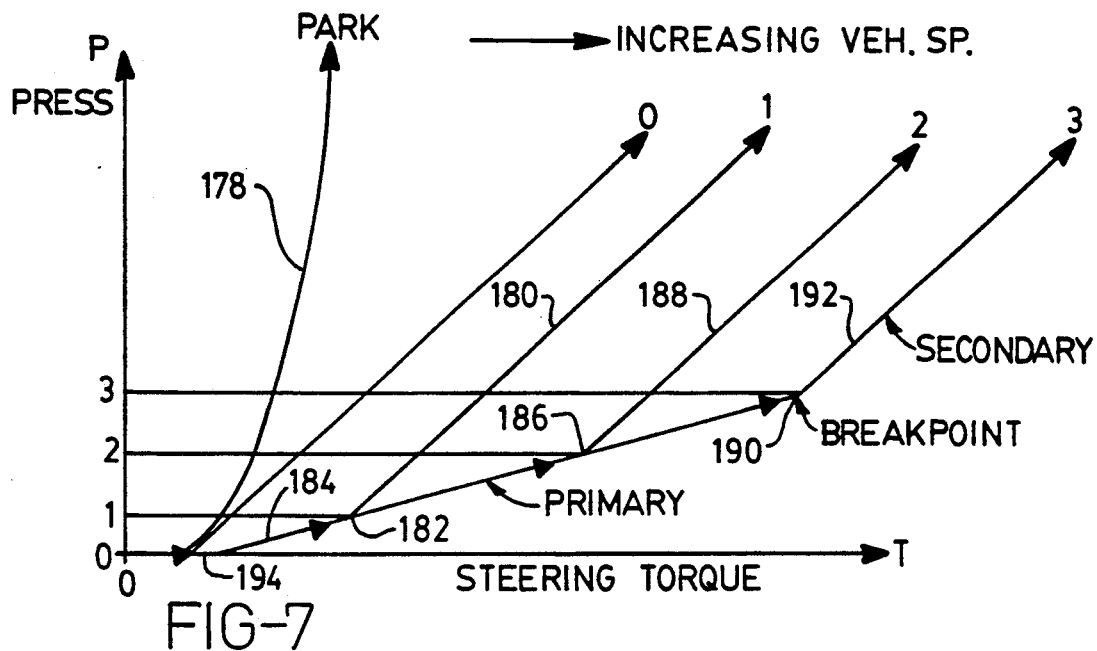
FIG. 7 is a graph showing the steering characteristics of a power steering mechanism embodying the improvements of my invention.

The force created by the pressure P2 opposes the spring force. It is apparent that if a force in addition to the force of the pressure P2 were to be introduced, the modulating characteristics of the valve of FIG. 6 would be changed. This additional force F in my improved invention is obtained by solenoid 176. The solenoid responds to a speed sensitive input signal received from a controller 177 that establishes an output signal proportional in magnitude to the signal received from a vehicle speed sensor 179. If the solenoid force F increases, the effective force S of the spring decreases. This will result in a shifting of the breakpoint pressure to the left as indicated in FIG. 7. FIG. 7 is a plot showing various breakpoint values.

In FIG. 7, the relationship between steering pressure and steering torque during parking maneuvers is indicated at 178. When the vehicle speed is very low, as indicated by line 180 in FIG. 7, a small increase in steering torque will result in a large increase in steering pressure. That relationship exists when the steering torque is greater than a breakpoint value 182. If the steering torque is less than the breakpoint value 182 for a given speed, the relationship between steering pressure and steering torque is shown by line 184 in FIG. 7, which is a linear relationship between steering pressure and torque.

When the vehicle speed increases further, the solenoid force acting to oppose a spring force decreases. This causes the breakpoint to shift to point 186. After breakpoint 186 is reached, the relationship between steering pressure and torque changes in slope as indicated at 188. Upon a further increase in speed, the breakpoint will occur at a higher torque as shown at 190. Further increases in torque beyond the breakpoint 190 will result in a relationship as shown at 192.

When the solenoid is energized, it reduces the effective spring force and the breakpoint pressure is reduced with decreasing vehicle speed. Below a chosen low speed, the reaction piston pressure is vented, which reduces the reaction torque to zero. This point is indicated at 194 in FIG. 7. It is seen, therefore, that a single solenoid modulator valve can provide a complete family of curves representing the pressure and torque relationship throughout a speed range from zero to some high speed value.

Figure 9:
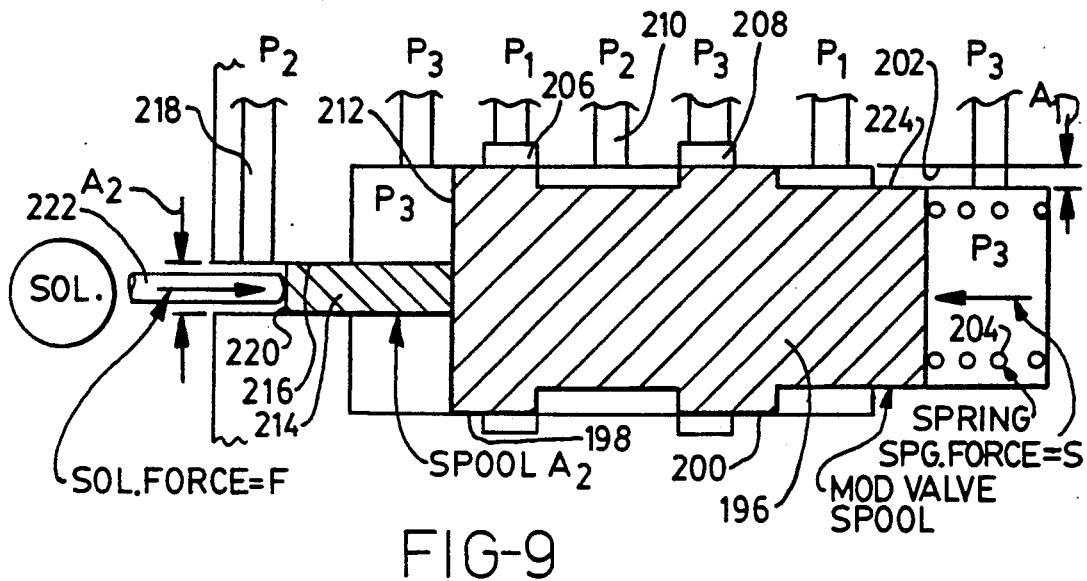
FIG. 9 shows an alternate design of the modulator valve used in the steering system of my invention.

Shown in FIG. 9 is a modified modulator valve. It is designed to reduce the solenoid bias forces. This makes it possible to use a solenoid of reduced size and simplifies the design while reducing the cost. The design of FIG. 9 comprises a valve spool 196 having spaced valve lands 198 and 200. Valve spool 196 is situated in valve chamber 202. it is urged in a left hand direction by valve spring 204.

Valve land 198 registers with inlet port 206 and land 200 registers with vent or return port 208. Output pressure passage 210, which communicates with the reaction pressure chambers, communicates with the valve chamber 202 intermediate ports 206 and 208. Return pressure acts on the left face 212 of the valve spool 196.

Valve spool 196 has an extension 214 of reduced diameter relative to the diameter of lands 198 and 200. Extension 214 is slidably received in reduced diameter portion 216 of the valve chamber 202. Internal passage 218 communicates with passage 210 and directs outlet pressure to the valves so that it acts on the left hand face 220 of extension 214. The solenoid 222 acts on the extension 214.

Compared to the valve illustrated in FIG. 6, the solenoid force required for the modified valve of FIG. 9 is reduced for any given functional characteristic. The force required of the solenoid at the maximum breakpoint, in the case of the design shown in FIG. 9, is equal to the quantity $P_1 \times (A_2 - A_1)$ where $A_1$ is equal to the differential area defined by the diameters of land 200 and the diameter of the valve spool at 224. By minimizing the quantity $A_2 - A_1$ for any given breakpoint and for any given ratio of $A_1 \div A_2$, the solenoid force is minimized.

Figure 10:
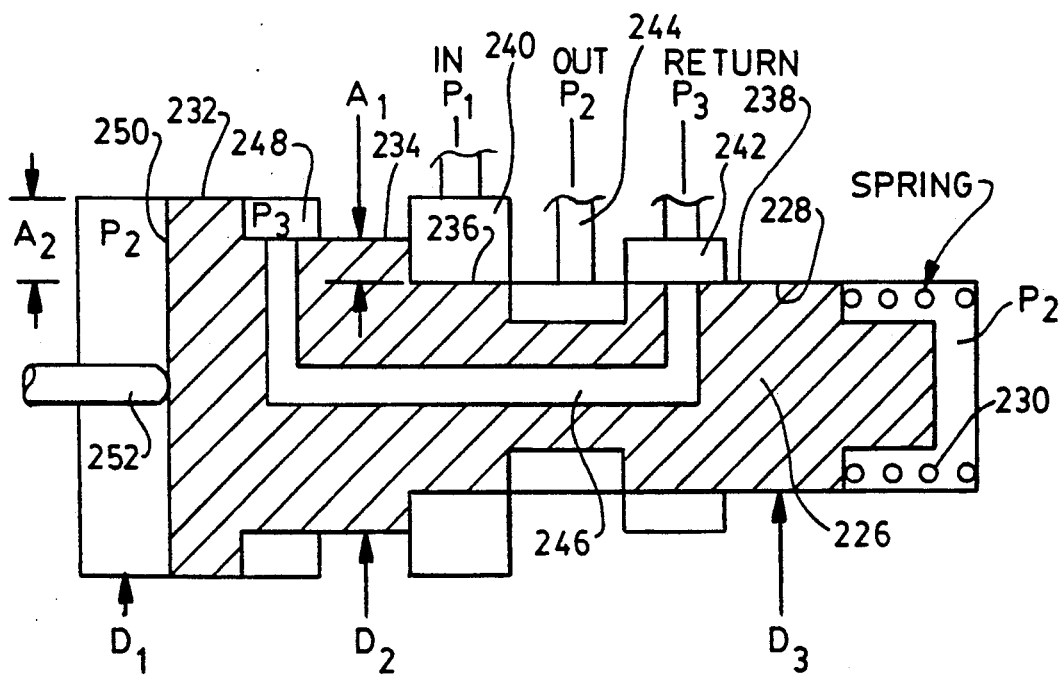
FIG. 10 is another embodiment of a steering valve that may be used in the steering gear system of my present invention.

In FIG. 10, I have shown a second alternate embodiment of the modulator valve. This is another design that achieves a reduced solenoid force. In the embodiment of FIG. 10, the solenoid spool is shown at 226. It is slidably disposed in valve chamber 228 and is urged in a left hand direction by valve spring 230.

Valve spool 226 has a first diameter valve land 232, a second valve land 234 of lesser diameter than valve 232, and a third valve land 236 of lesser diameter than valve land 234. Another valve land 238 has a diameter equal to the diameter of valve land 236.

Land 326 registers with inlet port 240 and land 238 registers with return pressure port 242. Outlet passage 244 communicates with the valve chamber intermediate lands 236 and 238.

Internal passage 246 establishes communication between port 242 and pressure chamber 248, which is defined by the differential area of land 232 and land 234. Return pressure acts on the differential area of lands 232 and 234. Outlet pressure communicates with the left hand face 250 of the valve spool 226. Internal passages (not shown) provide communication between the left hand side of the spool 226 and the passage 244.

A solenoid, schematically shown at 252, acts on the left hand side of the valve land 226 and urges it in a right hand direction, thus opposing the force of spring 230. The solenoid, as in the case of the other embodiments, is speed sensitive and produces a force that opposes the breakpoint spring force. The force of the solenoid is reduced because the area $A_2$, which is the differential area of lands 232 and 236 is reduced. Breakpoint pressure then equals $(S-F) \div (A_2 - A_1)$.

Having described preferred embodiments of my invention, what I claim and desire to secure by U.S. letters patent is:

1. A fluid pressure operated power steering gear mechanism for a vehicle comprising:
    a fluid pressure source, a steering pressure movable part adapted to be connected to a steering linkage for a vehicle, a drive member connected to said pressure movable part, a driving shaft connected to said drive member and adapted to transfer steering torque to said drive member;

a valve housing, a rotary steering valve means situated in said housing and partly defining pressure distribution and flow return passages extending between said pressure source and said pressure movable part for establishing steering pressure and steering pressure differential forces on said pressure movable part;

said steering valve means comprising an internal steering valve member and a surrounding sleeve steering valve member, said internal steering valve member and said sleeve steering valve member having registering valve lands, one of said steering valve members being connected to said driving shaft and the other being drivably connected to said drive member whereby relative rotary displacement of said steering valve members effects a change in the flow area through said steering valve means and a corresponding pressure differential change acting on said pressure movable part;

at least two pressure reaction pistons in one of said steering valve members, passage structure in said steering valve means for distributing reaction pressure for said pressure movable part to said reaction pistons thereby establishing opposed steering torque reaction forces;

means for applying said reaction forces to one of said steering valve members whereby relative angular displacement of said steering valve members is resisted;

reaction pressure control valve means communicating with said steering valve means for modifying said steering pressure to thereby establishing a value for said reaction pressure to increase the magnitude of said reaction pressure for a given relative angular displacement of said steering valve members when said steering torque exceeds a calibrated breakpoint value, and vehicle speed responsive means for applying an actuating force to said control valve means whereby said control valve means modifies said steering pressure when said steering torque exceeds a breakpoint value less than said calibrated value;

said control valve means comprising a movable valve spool having pressure regulating valve lands of differential diameters, said differential diameters defining a pressure area that is subjected to steering pressure, a valve spring acting on said valve spool in one direction, said actuating force of said vehicle speed responsive means opposing the force of said spring, a pressure force acting on said differential area of said valve spool supplementary to said actuating force of said vehicle speed responsive means.

2. The combination as set forth in claim 1 wherein said vehicle speed responsive means comprises a solenoid actuator, said actuator engaging said valve spool and applying a force on said valve spool that opposes said spring whereby said breakpoint value at which said steering pressure is modified occurs at a reduced steering torque as vehicle speed decreases.

3. A fluid pressure operated power steering gear mechanism for a vehicle comprising:

a fluid pressure source, a steering pressure movable part adapted to be connected to a steering linkage for a vehicle, a drive member connected to said pressure movable part, a torsion rod connecting said driving shaft to said drive member and adapted to develop steering torque on said drive member;

a rotary steering valve means situated in and partly defining pressure distribution and flow return passages extending between said pressure source and said pressure movable part to establish steering pressure and steering pressure differential forces on said pressure movable part;

said steering valve means comprising an internal valve member and a surrounding sleeve valve member, said internal valve member and said sleeve valve member having registering valve lands, one of said valve members being connected to said driving shaft and the other of said valve members being drivably connected to said drive member whereby deflection of said torsion rod effects changes in the flow area through said steering valve means and a corresponding pressure differential change acting on said pressure movable part;

at least two pressure reaction pistons in said sleeve value member, passage structure in said steering valve means for distributing reaction pressure for said pressure movable part to said reaction pistons thereby establishing opposed steering reaction forces;

means for applying said reaction forces to one of said valve members whereby relative angular displacement of said valve members is resisted;

modulator valve means communicating with said steering valve means for regulating said steering pressure to increase the magnitude of said reaction pressure for a given relative angular displacement of said valve members when said steering torque exceeds a calibrated breakpoint value; and a solenoid actuator means responsive to changes in vehicle speed for applying an actuating force to said modulator valve means, thereby adjusting the regulating characteristics of said modulator valve means to establish breakpoint values at reduced steering torque when said vehicle speed decreases;

said modulator valve means comprising a movable valve spool having pressure regulating valve lands of differential diameters, said differential diameters defining a pressure area that is subjected to steering pressure, a valve spring acting on said valve spool in one direction, said actuating force of said vehicle speed responsive means opposing the force of said spring, a pressure force acting on said differential area of said valve spool supplementary to said actuating force of said vehicle speed responsive means.

4. The combination as set forth in claim 3 wherein said vehicle speed responsive means comprises a solenoid actuator, said actuator engaging said valve spool and applying a force on said valve spool that opposes said spring whereby said breakpoint value at which said steering pressure is modified occurs at a reduced steering torque as vehicle speed decreases.

* * * * *